J. T. Walker,
Salt Cellar.

No. 111,281. Patented Jan. 24, 1871.

Witnesses:
Chas. Nida.
L. S. Maber

Inventor:
J. T. Walker
per Munn & Co.
Attorneys.

United States Patent Office.

JOHN T. WALKER, OF BROOKLYN, NEW YORK.

Letters Patent No. 111,281, dated January 24, 1871.

IMPROVEMENT IN SALT-CELLARS.

The Schedule referred to in these Letters Patent and making part of the same.

*To all whom it may concern:*

Be it known that I, JOHN T. WALKER, of Brooklyn, in the county of Kings and State of New York, have invented a new and improved Salt-Cellar; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
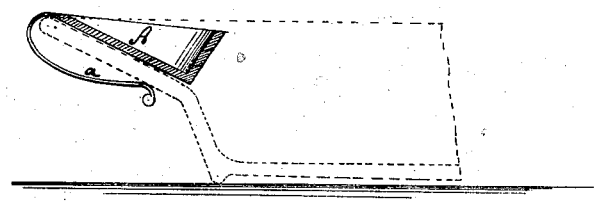
Figure 1 represents a sectional side view of my improved salt-cellar.
Figure 2:
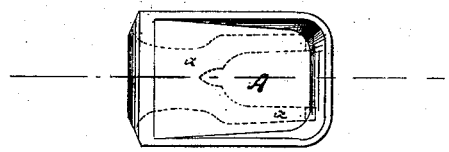
Figure 2 is a top view of the same.

This invention relates to a new salt-cellar, which is provided with a clamping-spring to be readily attached to or detached from the edge of a plate.

The invention consists in the new self-fastening salt-cellar having the spring-clamp.

A in the drawing represents a salt-cellar of suitable form and size.

From one of its sides projects a spring, $a$, which is bent down under it, as shown.

The device is readily applied to the flange of a plate by placing the vessel A above and the spring $a$ below said flange, as indicated in fig. 1.

The spring presses with sufficient power against the under side of the flange to retain the salt-cellar in place.

The apparatus is made of metal, rubber, wood, or other suitable material.

Having thus described my invention,

I claim as new and desire to secure by Letters Patent—

The salt-cellar provided with the clamping-spring, as specified.

JOHN T. WALKER.

Witnesses:
  GEO. W. MABEE,
  ALEX. F. ROBERTS.